(12) United States Patent
Alshurafa et al.

(10) Patent No.: US 12,515,380 B2
(45) Date of Patent: Jan. 6, 2026

(54) LIGHTWEIGHT MODULAR HYBRID ELECTRO-MECHANICAL COLLAPSIBLE AND EXPANDABLE MANDREL FOR FORMING PRISMATIC AND NON-PRISMATIC HOLLOW BARS AND/OR CYLINDERS FOR USE AS BUILDING MATERIALS AND METHOD FOR MAKING SAME

(71) Applicant: UNIVERSITY OF PITTSBURGH—OF THE COMMONWEALTH SYSTEM OF HIGHER EDUCATION, Pittsburgh, PA (US)

(72) Inventors: Sami Alshurafa, Johnstown, PA (US); Laura Marie Wieserman, Blairsville, PA (US)

(73) Assignee: University of Pittsburgh—Of the Commonwealth System of Higher, Pittsburgh, PA (US)

( * ) Notice: Subject to any disclaimer, the term of this patent is extended or adjusted under 35 U.S.C. 154(b) by 90 days.

(21) Appl. No.: 18/634,222

(22) Filed: Apr. 12, 2024

(65) Prior Publication Data
US 2024/0342962 A1 Oct. 17, 2024

Related U.S. Application Data

(60) Provisional application No. 63/459,350, filed on Apr. 14, 2023.

(51) Int. Cl.
*B29C 70/30* (2006.01)
*B29C 33/50* (2006.01)
*B29L 23/00* (2006.01)

(52) U.S. Cl.
CPC ............ *B29C 33/505* (2013.01); *B29C 70/30* (2013.01); *B29L 2023/22* (2013.01)

(58) Field of Classification Search
CPC ............................. B29C 33/505; B29C 70/30
See application file for complete search history.

(56) References Cited

U.S. PATENT DOCUMENTS

| | | | | |
|---|---|---|---|---|
| 1,093,284 | A | * | 4/1914 | Mehlum ............ B65H 75/2487 |
| | | | | 242/574.1 |
| 1,966,391 | A | * | 7/1934 | Hill ........................ B23B 31/12 |
| | | | | 269/157 |

(Continued)

*Primary Examiner* — Jeffry H Aftergut
(74) *Attorney, Agent, or Firm* — Paul D. Bangor, Jr.; Clark Hill PLC (57) ABSTRACT

An elongated modular collapsible and expandable mandrel for forming prismatic or non-prismatic hollow bars of various cross-sections, comprising: a plurality of outer segments configured to define a prismatic or non-prismatic mandrel outer surface; a plurality of hub assemblies with each hub assembly comprising a central hub and a plurality of support members spaced-apart around a perimeter of the central hub, each support member is pivotally attached to a respective one of the plurality of outer segments by a first end of a link with the second end of the link pivotally attached to its respective central hub; and means for moving each central hub linearly causing each of its links to pivot toward or away from, depending upon the direction of axial movement of the central hub, a longitudinal axis of the means for moving each central hub linearly while the central hub moves linearly thereby expanding or contracting the cross-sectional dimension of the respective portions of the mandrel to which each of the plurality of hub assemblies is attached.

20 Claims, 7 Drawing Sheets

(56) References Cited

U.S. PATENT DOCUMENTS

| | | | | |
|---|---|---|---|---|
| 2,682,924 A | * | 7/1954 | Maquat | B29C 33/485 |
| | | | | 279/2.16 |
| 2,845,658 A | * | 8/1958 | Knibb | B29C 53/824 |
| | | | | 156/598 |
| 4,389,180 A | * | 6/1983 | Gordon | B29C 57/04 |
| | | | | 249/181 |

* cited by examiner

FIG. 10 ial Field

LIGHTWEIGHT MODULAR HYBRID ELECTRO-MECHANICAL COLLAPSIBLE AND EXPANDABLE MANDREL FOR FORMING PRISMATIC AND NON-PRISMATIC HOLLOW BARS AND/OR CYLINDERS FOR USE AS BUILDING MATERIALS AND METHOD FOR MAKING SAME

RELATED APPLICATION

This application claims priority benefit under 35 U.S.C. § 119 (e) of U.S. Provisional Application No. 63/459,350 filed Apr. 14, 2023, the contents of which are herein incorporated by reference.

FIELD OF THE DISCLOSURE

Technical Field

The present disclosure generally relates to the fields of analysis, design, fabrication, and testing of next-generation fiber-reinforced polymer (FRP) building materials such as for guyed structures to support meteorological and wind monitoring instruments that address icing, durability, and survivability in cold climates using advanced composite materials.

Background

Based on extensive research conducted over a few years, new advanced technology in the field of civil engineering was developed. The technology encompasses the analysis, design, fabrication, and testing of next-generation fiber-reinforced polymer (FRP) building materials such as for guyed structures to support meteorological and wind monitoring instruments that address icing, durability, and survivability in cold climates using advanced composite materials.

When it came to manufacturing guyed tower cells, the research project ran into a major stumbling block. Taking the FRP structures out of the mold or off of a mandrel. This is because the tower cells were prismatic and non-prismatic, making it extremely difficult to remove them from the mandrel or mold after they had been cured. As a result, a lightweight modular hybrid electro-mechanical collapsible and expandable mandrel device of the present disclosure is desirable as it allows the formation of both uniform and nonuniform cross-sections of FRP hollow bars or segments and the easy removal of the finished part, such as for use as tower cells, from mandrels or molds post-curing.

BRIEF SUMMARY OF THE DISCLOSURE

In a preferred aspect, the present disclosure comprises an elongated modular collapsible and expandable mandrel for forming prismatic or non-prismatic hollow bars of various cross-sections, comprising: a plurality of outer segments configured to define a prismatic or non-prismatic mandrel outer surface; a plurality of hub assemblies with each hub assembly comprising a central hub and a plurality of support members spaced-apart around a perimeter of the central hub, each support member is pivotally attached to a respective one of the plurality of outer segments by a first end of a link with the second end of the link pivotally attached to its respective central hub; and means for moving each central hub linearly causing each of its links to pivot toward or away from, depending upon the direction of axial movement of the central hub, a longitudinal axis of the means for moving each central hub linearly while the central hub moves linearly thereby expanding or contracting the cross-sectional dimension of the respective portions of the mandrel to which each of the plurality of hub assemblies is attached.

In another preferred aspect of an elongated modular collapsible and expandable mandrel for forming prismatic or non-prismatic hollow bars of various cross-sections of the present disclosure, the means for moving each central hub linearly comprises a threaded rod powered by a motor.

In yet another preferred aspect of an elongated modular collapsible and expandable mandrel of the present disclosure, the means for moving each central hub linearly comprises one or more hydraulic or electrically powered linear actuators.

In another preferred aspect of an elongated modular collapsible and expandable mandrel of the present disclosure, each central hub of the plurality of hub assemblies comprises a threaded nut, wherein each of the threaded nuts is rotatably disposed on an individual or respective threaded rod mounted for rotation between a set of end bearings.

In a further preferred aspect, an elongated modular collapsible and expandable mandrel of the present disclosure further comprises a motor for rotating one or more of the threaded rods.

In another preferred aspect of an elongated modular collapsible and expandable mandrel of the present disclosure, the mandrel comprises three threaded rods and each of the threaded rods are co-linear with each other and the motor rotates one of the threaded rods disposed in the middle between the other two threaded rods.

In yet another preferred aspect of an elongated modular collapsible and expandable mandrel of the present disclosure, each link is pivotally attached to one or more first tabs on its respective support member and pivotally attached to one or more second tabs on its central hub.

In another preferred aspect of an elongated modular collapsible and expandable mandrel of the present disclosure, each link is pivotally attached to one or more first tabs on its respective support member and pivotally attached to one or more second tabs on its central hub.

In yet another preferred aspect of an elongated modular collapsible and expandable mandrel of the present disclosure, the mandrel outer surface generally defines the shape of a cylinder, rectangular bar, or a cone.

In a further preferred aspect of an elongated modular collapsible and expandable mandrel of the present disclosure, the mandrel outer surface generally defines the shape of a cylinder, rectangular bar, or a cone.

In another preferred aspect of an elongated modular collapsible and expandable mandrel of the present disclosure, each of the plurality of outer segments comprises FRP or GFRP.

In yet another preferred aspect of an elongated modular collapsible and expandable mandrel of the present disclosure, each of the plurality of outer segments comprises FRP or GFRP.

In another preferred aspect of an elongated modular collapsible and expandable mandrel of the present disclosure, the mandrel has a circular cross-section or a non-circular cross-section.

In another preferred aspect of an elongated modular collapsible and expandable mandrel of the present disclosure, the mandrel has a circular cross-section or a non-circular cross-section.

In yet another preferred aspect of an elongated modular collapsible and expandable mandrel of the present disclosure, the mandrel has an outside shape that changes from prismatic to non-prismatic along a longitudinal axis of the mandrel.

In another preferred aspect of an elongated modular collapsible and expandable mandrel of the present disclosure, the mandrel has an outside shape that changes from prismatic to non-prismatic along a longitudinal axis of the mandrel.

In another preferred aspect, the present disclosure comprises a method for manufacturing prismatic or non-prismatic hollow bars of various cross-sections, comprising: providing an elongated modular collapsible and expandable mandrel for forming prismatic or non-prismatic hollow bars of various cross-sections, comprising: a plurality of outer segments configured to define a prismatic or non-prismatic mandrel outer surface; a plurality of hub assemblies with each hub assembly comprising a central hub and a plurality of support members spaced-apart around a perimeter of the central hub, each support member is pivotally attached to a respective one of the plurality of outer segments by a first end of a link with the second end of the link pivotally attached to its respective central hub; and means for moving each central hub linearly causing each of its links to pivot toward or away from, depending upon the direction of axial movement of the central hub, a longitudinal axis of the means for moving each central hub linearly while the central hub moves linearly thereby expanding or contracting the cross-sectional dimension of the respective portions of the mandrel to which each of the plurality of hub assemblies is attached; linearly moving each central hub to expand or contract as desired the cross-sectional dimension of the respective portions of the mandrel to which each of the plurality of hub assemblies is attached; wrapping GFRP or RFP material containing epoxy resin around the mandrel outer surface; curing the GFRP or RFP material containing epoxy resin; linearly moving each central hub to contract each cross-sectional dimension of the respective portions of the mandrel to which each of the plurality of hub assemblies is attached enough to remove the cured GFRP or RFP epoxy material.

In another preferred aspect of a method for manufacturing prismatic or non-prismatic hollow bars of various cross-sections of the present disclosure, each central hub of the plurality of hub assemblies comprises a threaded nut, wherein each of the threaded nuts is rotatably disposed on an individual or respective threaded rod mounted for rotation between a set of end bearings.

In yet another preferred aspect of a method for manufacturing prismatic or non-prismatic hollow bars of various cross-sections of the present disclosure, the elongated modular collapsible and expandable mandrel further comprises a motor for rotating one or more of the threaded rods.

In another preferred aspect of a method for manufacturing prismatic or non-prismatic hollow bars of various cross-sections of the present disclosure, the mandrel comprises three threaded rods and each of the threaded rods are co-linear with each other and the motor rotates one of the threaded rods disposed in the middle between the other two threaded rods.

BRIEF DESCRIPTION OF THE DRAWINGS

For the present disclosure to be easily understood and readily practiced, the present disclosure will now be described for purposes of illustration and not limitation in connection with the following figures, wherein.

DETAILED DESCRIPTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single inventive concept if more than one is in fact disclosed.

The following description is, therefore, not to be taken in a limited sense, and the scope of the inventive subject matter is defined by the appended claims and their equivalents.

A preferred modular mandrel 10 of the present disclosure features a one-of-a-kind lightweight modular hybrid electro-mechanical design that includes an inner support assembly 12 comprising three internal hub assemblies 30 that can move axially on respective threaded rods 14,15,16 connected to bearing plates 13 and support plates 19. Each of the hub assemblies 30 has three spaced-apart support members 31 movable radially from a fully extended position to a fully retracted position or therebetween by rotating their respective threaded rods 14,15,16 within flange-mounted bearings 13. Such rotation, manual or powered, allows nut 34 of each hub assembly 30 to move axially with respect to its attached support members 31 which stay stationary as does the outer mandrel segment 40 to which such support members 31 are attached. Because each hub assembly 30 can move independently of each other hub assembly 30, the support members 31 of each hub assembly can be set at the same or differing outer diameters. In this manner, outer diameters of the produced hollow bars 50 can be made to be prismatic or non-prismatic. In addition, more or less hub assemblies 30 can be utilized, and their placement customized along threaded rods 14, 15, 16, to produce the outer profile desired for hollow bars 50. Again, threaded rods 14, 15, 16 can be rotated clockwise or counterclockwise to control the radial expanding/collapsing of the support members 31 of each hub assembly 30 within each module 11 of a given mandrel 10 via either manual mechanical rotation or electrical rotation through the use of a stepper motor 18 for precise prismatic or non-prismatic control. In another preferred embodiment, the axial movement of each hub assembly 30 relative to its respective outer section 40 could be achieved by a linear actuator such as a hydraulic cylinder (not shown) instead of using a motor and threaded rods. As described above and below, internal support assembly 12 is preferably used to convert the radial expanding/collapsing of each section of each module 11 where a hub assembly 30 is located to precisely control the outer diameter of each such section of each module 11. Outer sections 40 are preferably made from carbon fiber sheets used as the mandrel surface for molding the shape of the FRP hollow bars 50. Each internal support assembly 12 can reposition itself and form different sizes and shapes of cross-sections. Each module 11 of mandrel 10 preferably may be used to manufacture 3 meter-long (or other desired length and diameter) prismatic or non-prismatic hollow bars 50 preferably made of FRP or GFRP. Such hollow bars 50 may preferably be used as building materials, such as for example, to construct a 120-meter-tall multi-cell GFRP composite guyed tower.

Furthermore, mandrel 10 of the present disclosure has been preferably created in such a way that it could be internally transformed via articulation of the internal support assembly 12 to allow for prismatic or non-prismatic hollow bars 50 of any length to be obtained. Mandrel 10 comes with accessories that can be attached to it to allow the fabrication of various geometric shapes or cells, such as an L or T shape, or any engineering imaginable shape. These shapes, lengths, and cross-sections will be used in a variety of engineering/building projects involving the development and testing of energy-efficient lightweight prefab modular and mobile facility generation.

Advanced technology in the field of civil engineering has included the analysis, design, fabrication, and testing of a new generation of fiber-reinforced polymer guyed structures to support meteorological and wind monitoring instruments that address icing, durability, and survivability in cold climates by using advanced composite materials. When it came to manufacturing guyed tower cells, however, the research project ran into a fundamental issue. This is because the tower cells are prismatic and removing them from the mold after they had cured was extremely difficult. As a result, a lightweight hybrid electro-mechanical collapsible and expandable mandrel 10 of the present disclosure has been invented and manufactured as described herein to allow the finished hollow bars 50 of the tower cell to be easily removed from the outer segments 40 of mandrel 10.

Figure 1:
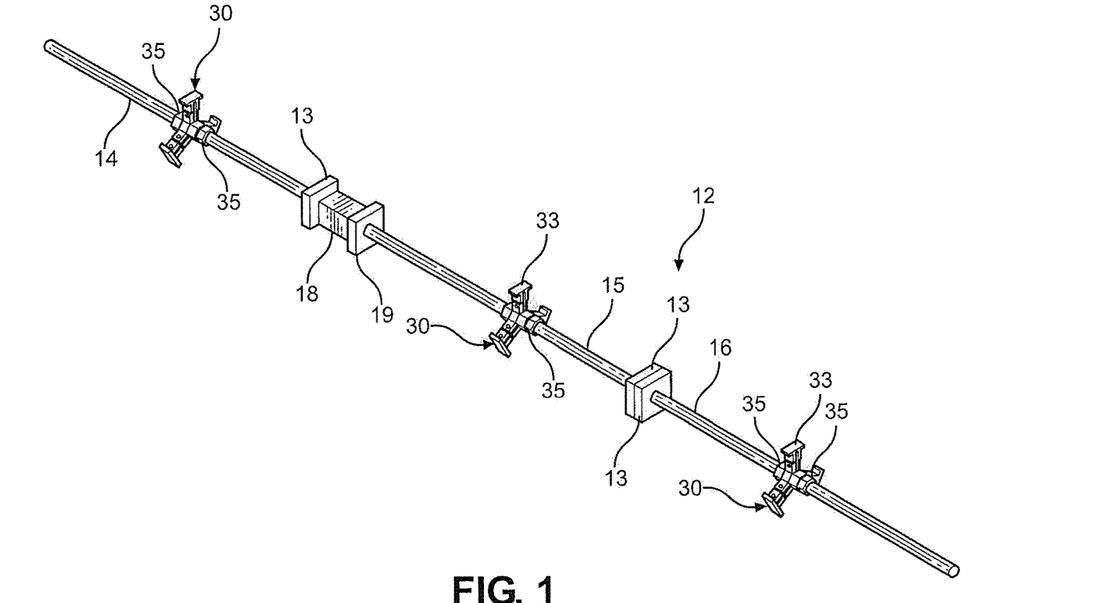
FIG. 1 is a top perspective view of a preferred inner support assembly of an elongated modular collapsible and expandable mandrel for forming prismatic or non-prismatic hollow bars of various cross-sections of the present disclosure comprising means for moving each central hub thereof linearly.

Mandrel 10 preferably may be used to make structures having an unlimited number of parts due to its modular design. Each section 11 of mandrel 10 is controlled and calibrated individually. A preferred mandrel 10 of the present disclosure comprises five (5) ball bearings 13 to connect three pieces 14, 15, 16 of 1.5 m long of ACME left-hand threaded rods 14, 15, and right-hand threaded rod 16 and a NEMA 23 stepper motor 18 as shown in FIG. 1.

Figure 2A:
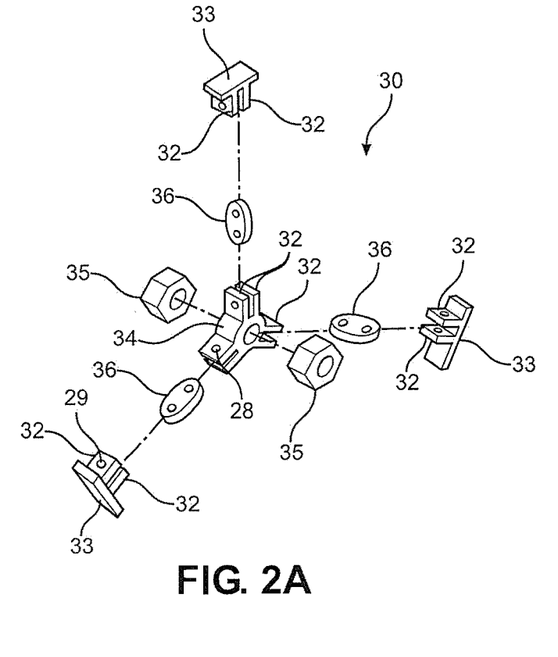
FIG. 2A is a top perspective and expanded view of a preferred hub assembly of an elongated modular collapsible and expandable mandrel for forming prismatic or non-prismatic hollow bars of various cross-sections of the present disclosure.
Figure 2B:
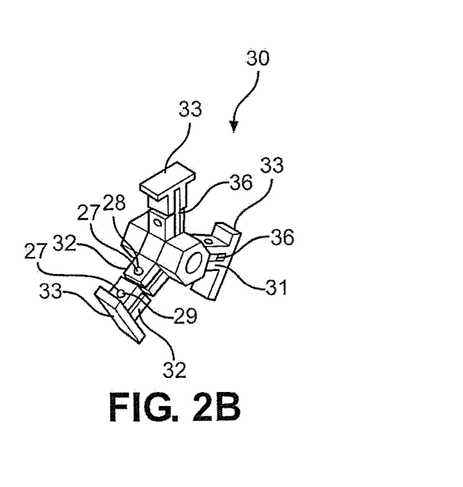
FIG. 2B is a top perspective view of a preferred hub assembly of an elongated modular collapsible and expandable mandrel for forming prismatic or non-prismatic hollow bars of various cross-sections of the present disclosure.

Preferably a total of 24 steel pieces or tabs 32 (tabs 32 are shown in FIGS. 2A-2B as square but could be any required shape) were cut with dimensions of 25.4 mm×25.4 mm×8.38 mm. Each piece or tab 32 has a central, circular opening 28 or 29 with a diameter of 8.38 mm. Preferably, three hub assemblies 30 are used in each modular section 11 of mandrel 10. Each hub assembly 30 preferably comprises of six square pieces or tabs 32 welded to 25.4 mm acme nut 34. Each hub assembly 30 preferably comprises three outer segment support members 31 for supporting outer sections 40 as discussed below. Each outer segment support member 31 is preferably made of two square pieces or tabs 32 and one rectangular piece 33 as shown in FIG. 2. Each support member 31 is preferably attached to its respective hub assembly 30 via links 36 having dimensions of 50.8 mm×25.4 mm×8.38 mm. Here, each support member 31 can pivot about the pins 27 in each of openings 28 and 29 wherein such pins attach each link 36 to the square pieces or tabs 32 of its support member 31 and of its nut 34. As described above, this pivoting nature of each link 36 allows each support member 31 to extend and contract anywhere between fully-extend and fully retracted positions. The hub assembly is shown in FIGS. 2A-2B. Additional Acme nuts 35 or the like are preferably used to locate each hub assembly 30 on its respective threaded rod 14, 15, 16.

Figure 3:
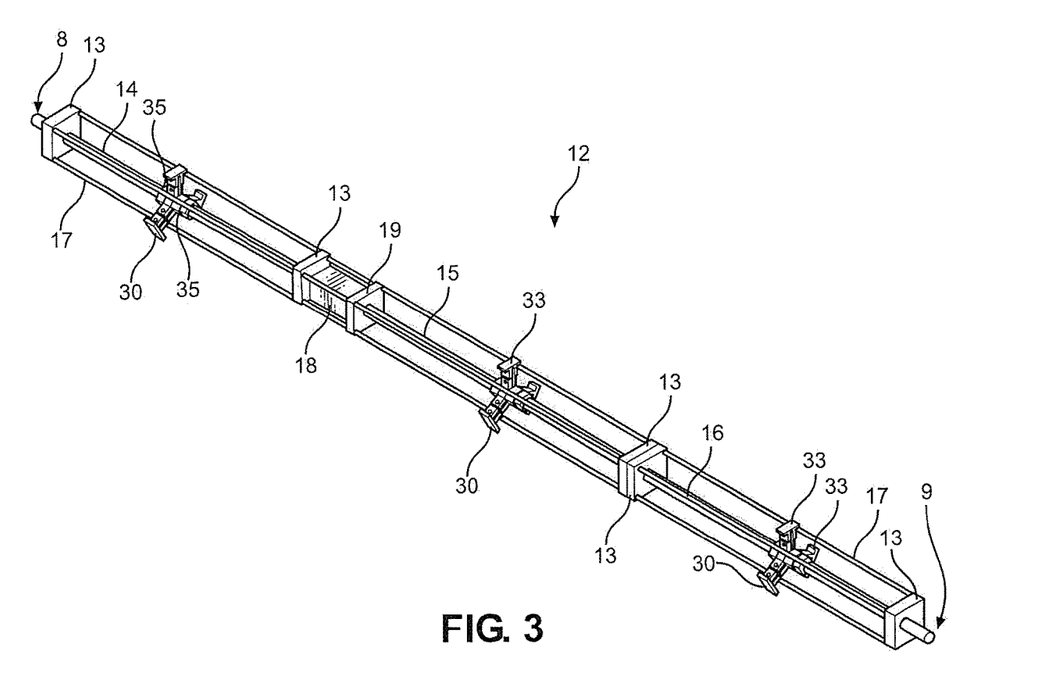
FIG. 3 is a top perspective view of a partially assembled preferred embodiment of an elongated modular collapsible and expandable mandrel for forming prismatic or non-prismatic hollow bars of various cross-sections of the present disclosure.
Figure 10:
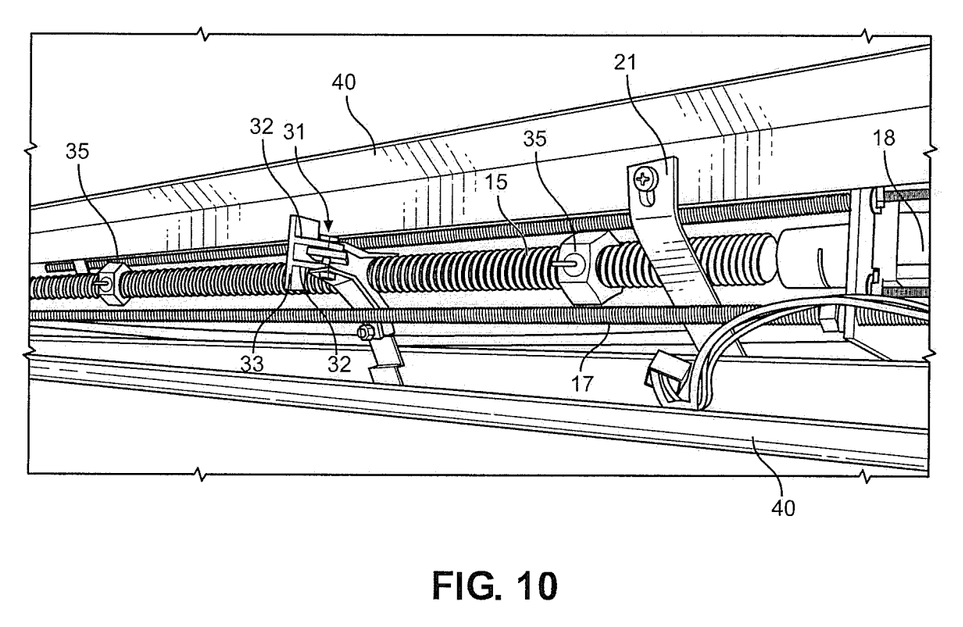
FIG. 10 is top perspective view of a partially assembled preferred embodiment of an elongated modular collapsible and expandable mandrel for forming prismatic or non-prismatic hollow bars of various cross-sections of the present disclosure.

Preferably, a hub assembly 30 was placed at 550 mm from each end 8, 9 of the internal support assembly 12. The third hub assembly 30 was placed at the center of middle threaded rod 15. The three hub assemblies 30 connected to the threaded rods 14, 15, 16 to form internal support assembly 12 are shown in FIG. 3. Preferably, the output 20 shaft of stepper motor 18 is reduced to a diameter of 8 mm and one side of the shaft of threaded rod 15 of the device 10 was reduced to 12 mm. The 8 mm motor shaft, and the 12 mm reduced end of threaded rod 15 were connected via a rigid clamp-on coupling 19. Five rotations of the output shaft of stepper motor 18 correspond to a travel distance of 1" for each of the hub assemblies 30 (5 rotations of stepper motor output shaft equals 1" horizontal travel for each hub assembly 30). Internal support assembly 12 further comprises additional support rods 17 and reinforcing braces 21 as shown in FIGS. 3 and 10. In this preferred embodiment of mandrel 10, motor 18 is used to rotate middle rod 15 since the middle rod would be most difficult to rotate manually as it is furthest from either open end of mandrel 10. However, motor 18 but could be used to rotate either of the other rods 14 or 16, or additional motors could be used to rotate such other threaded rods as desired.

Figure 4A:
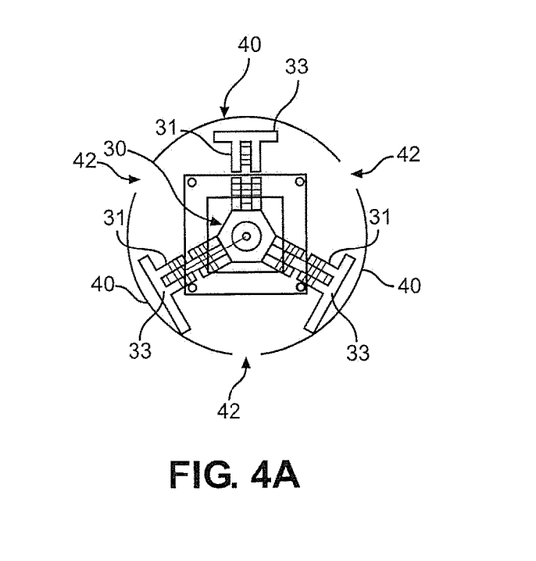
FIG. 4A is a cross-sectional view of a preferred embodiment of an elongated modular collapsible and expandable mandrel for forming prismatic or non-prismatic hollow bars of various cross-sections of the present disclosure.
Figure 4B:
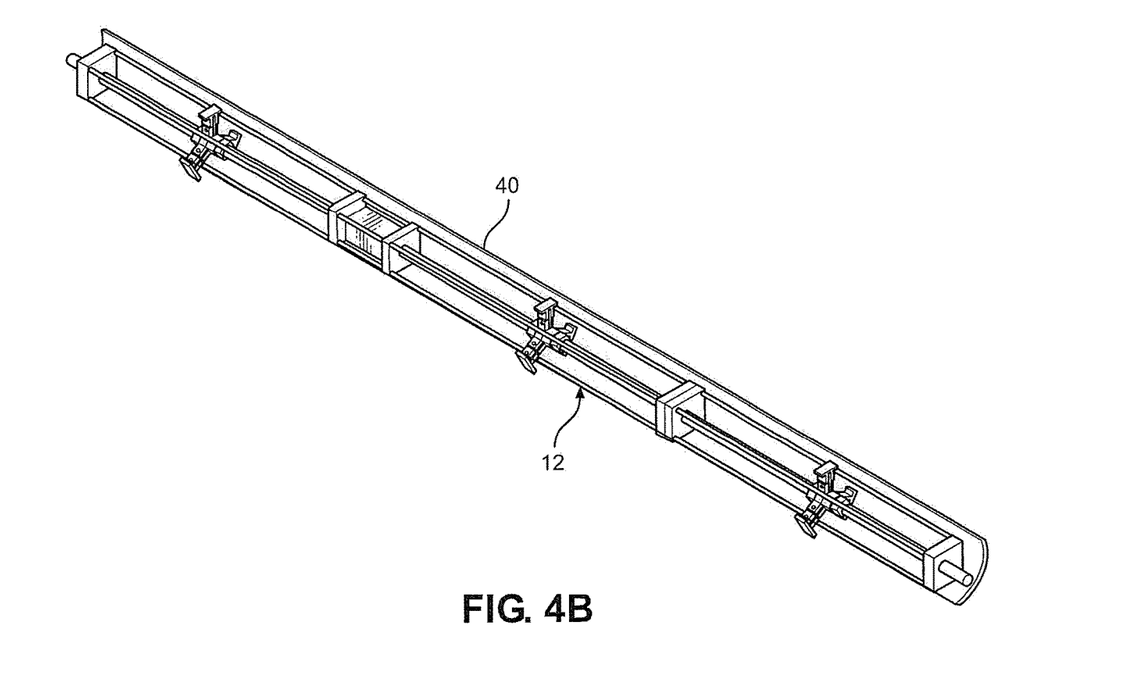
FIG. 4B is a top perspective view of a partially assembled preferred embodiment of an elongated modular collapsible and expandable mandrel for forming prismatic or non-prismatic hollow bars of various cross-sections of the present disclosure.
Figure 4C:
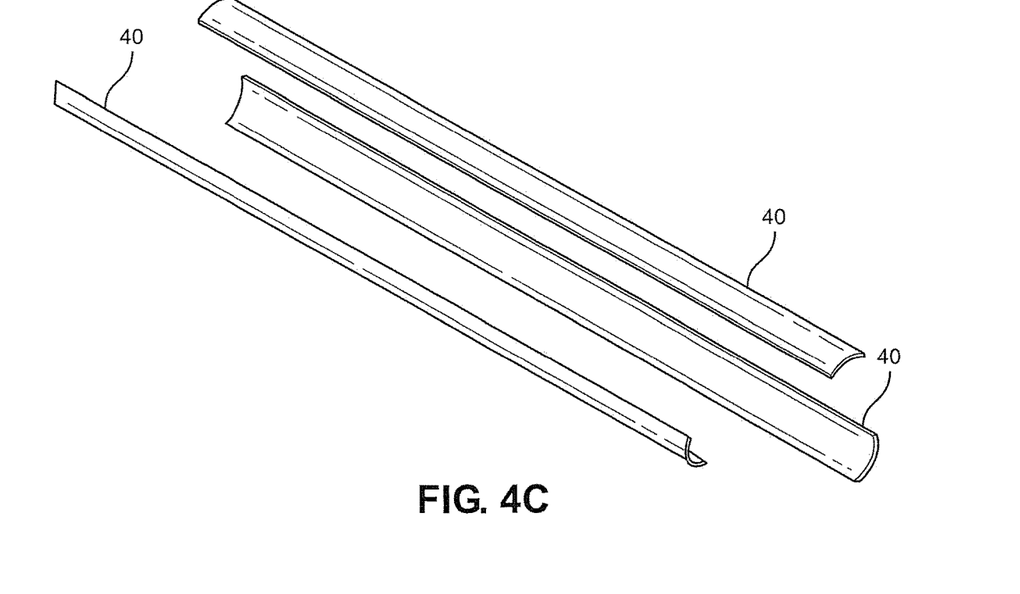
FIG. 4C is a top perspective and expanded view of preferred outer sections of an elongated modular collapsible and expandable mandrel for forming prismatic or non-prismatic hollow bars of various cross-sections of the present disclosure.
Figure 5:
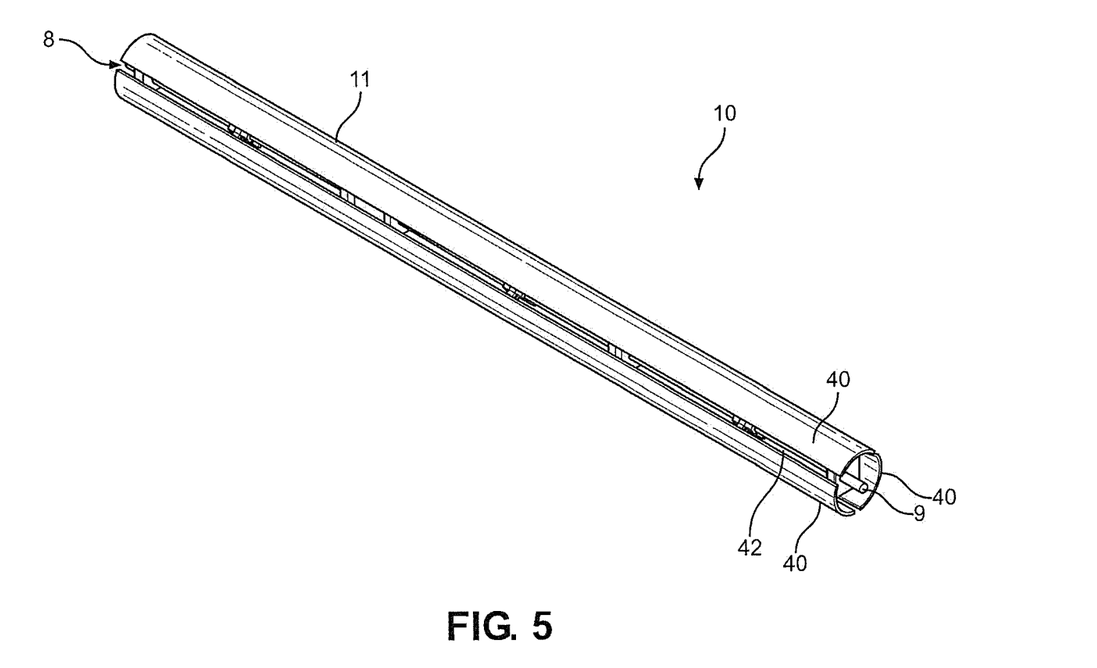
FIG. 5 is a top perspective view of a preferred elongated modular collapsible and expandable mandrel for forming prismatic or non-prismatic hollow bars of various cross-sections of the present disclosure.

Three outer sections 40 of carbon fiber-reinforced polymer sheets preferably of 4 mm thickness were manufactured and cut to a specified outside shape using a laser technique to form a preferred outside shape of each module 11 of mandrel 10. While the cross-sectional shape of each module 11 of mandrel 10 shown in FIG. 4A is circular, it can be manufactured in any shape desired. FIGS. 4A-4C depict the dimensions of the three outer sections 40. Preferably, each outer section may comprise a 3000 mm long CFRP sheet having a thickness of about 5 mm. The final assembly of mandrel 10 is shown FIGS. 4A and 5. A preferred embodiment of mandrel 10 has a cross-sectional diameter of about 200 mm in its fully collapsed position with gaps 42 between outer sections 40 of about 25 mm. Outside segments 40 preferably may be made from FRP of GFRP materials.

Preferably, for attaching each of the support members 31 to its respective outer segment 40, a 100 mm×20 mm×10 mm sheet carbon-reinforced polymer (not shown) is bonded to the soffit of such respective outer segment 40 where the support member 31 is desired to be attached. Support member 31 can then be attached to the carbon-reinforced polymer sheet by a screw or other appropriate fastener. All other required support members 31 are preferably attached to their respective outer segments 40 in the same manner.

Assembly Calibration Method

Figure 6:
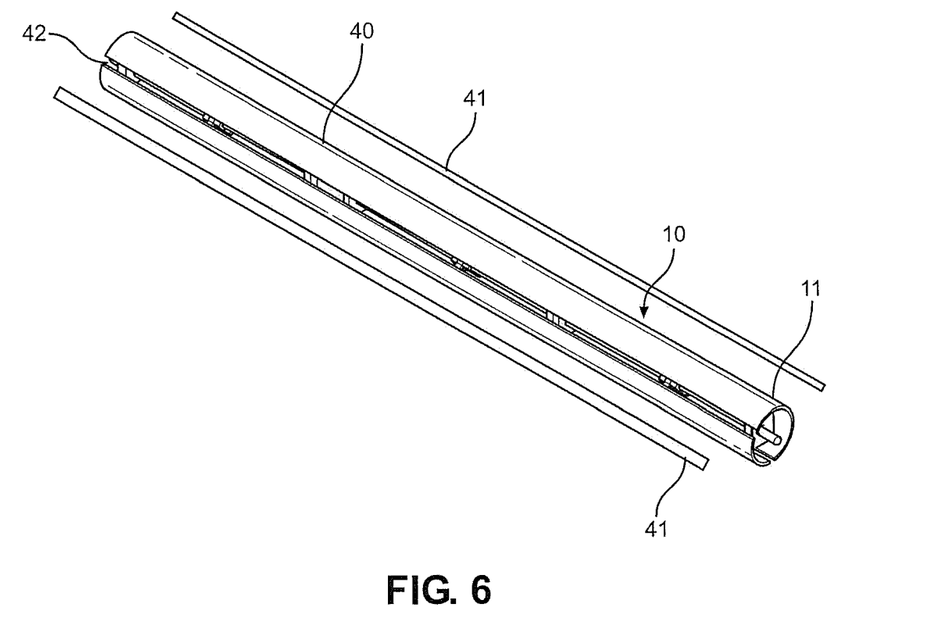
FIG. 6 is another top perspective view of a preferred elongated modular collapsible and expandable mandrel for forming prismatic or non-prismatic hollow bars of various cross-sections of the present disclosure.
Figure 7:
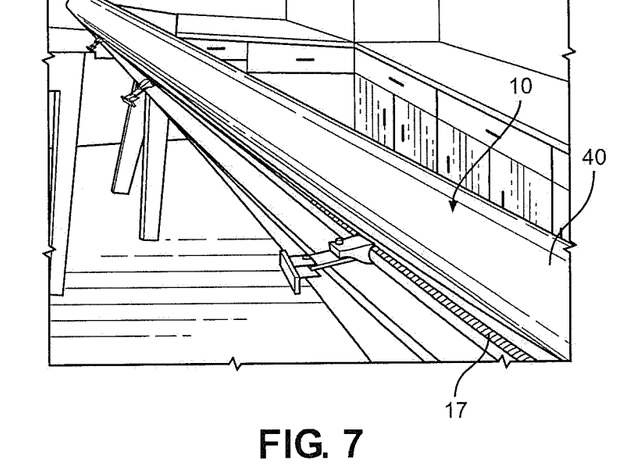
FIG. 7 is yet another top perspective view of a preferred elongated modular collapsible and expandable mandrel for forming prismatic or non-prismatic hollow bars of various cross-sections of the present disclosure.
Figure 8A:
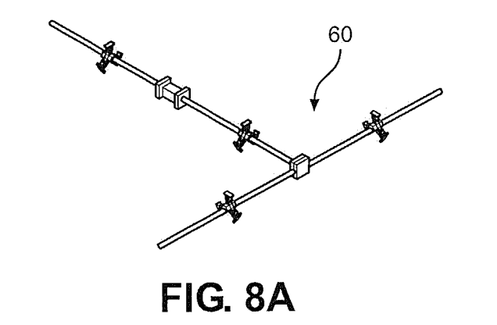
FIG. 8A is a top perspective view of a preferred "T-shaped" configuration of elongated modular collapsible and expandable mandrels of the present disclosure for forming shaped building components comprising prismatic or non-prismatic hollow bars of various cross-sections according to the present disclosure.
Figure 8B:
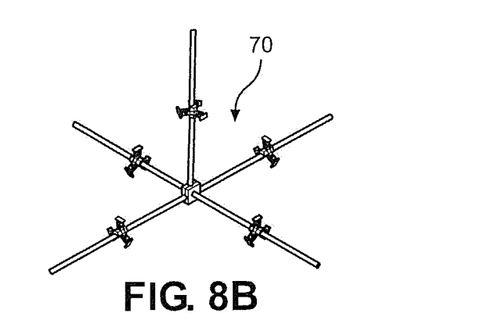
FIG. 8B is a top perspective view of a preferred "X-shaped" configuration of elongated modular collapsible and expandable mandrels of the present disclosure for forming shaped building components comprising prismatic or non-prismatic hollow bars of various cross-sections according to the present disclosure.
Figure 8C:
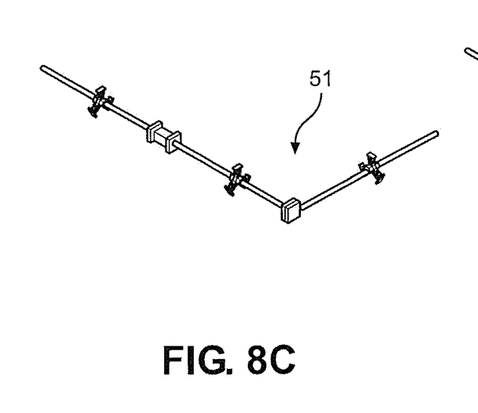
FIG. 8C is a top perspective view of a preferred "L-shaped" configuration of elongated modular collapsible and expandable mandrels of the present disclosure for forming shaped building components comprising prismatic or non-prismatic hollow bars of various cross-sections according to the present disclosure.
Figure 8D:
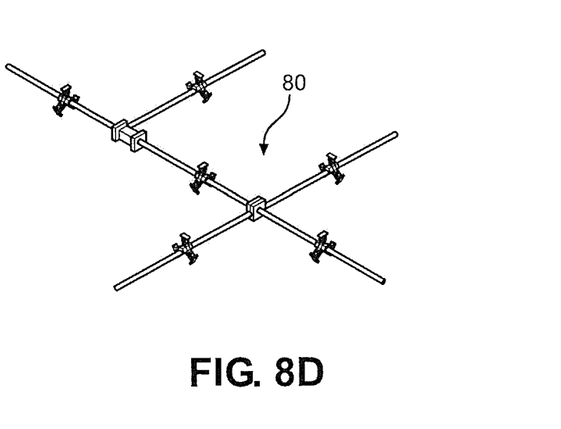
FIG. 8D is a top perspective view of a preferred configuration comprising multiple "L-shaped" segments of elongated modular collapsible and expandable mandrels of the present disclosure for forming shaped building components comprising prismatic or non-prismatic hollow bars of various cross-sections according to the present disclosure.
Figure 9A:
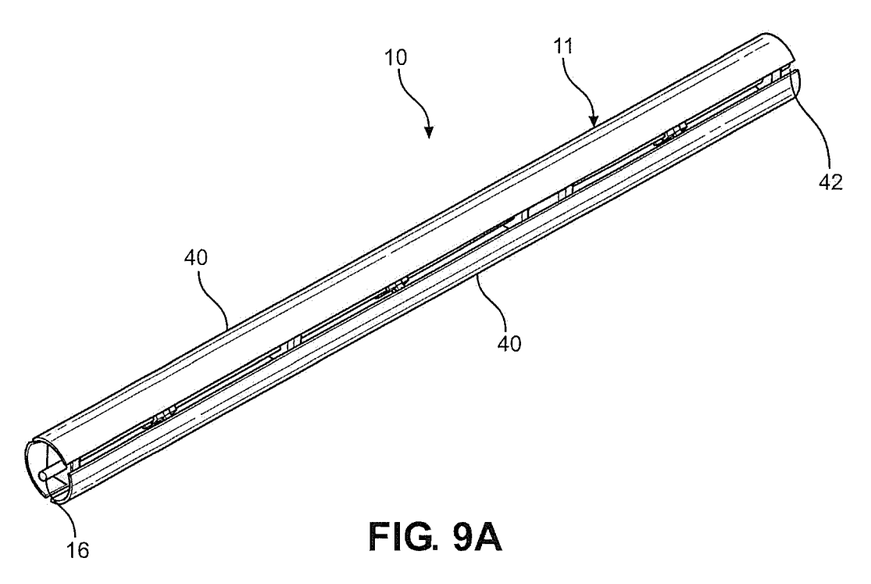
FIG. 9A is another top perspective view of a preferred elongated modular collapsible and expandable mandrel for forming prismatic or non-prismatic hollow bars of various cross-sections of the present disclosure.
Figure 9B:
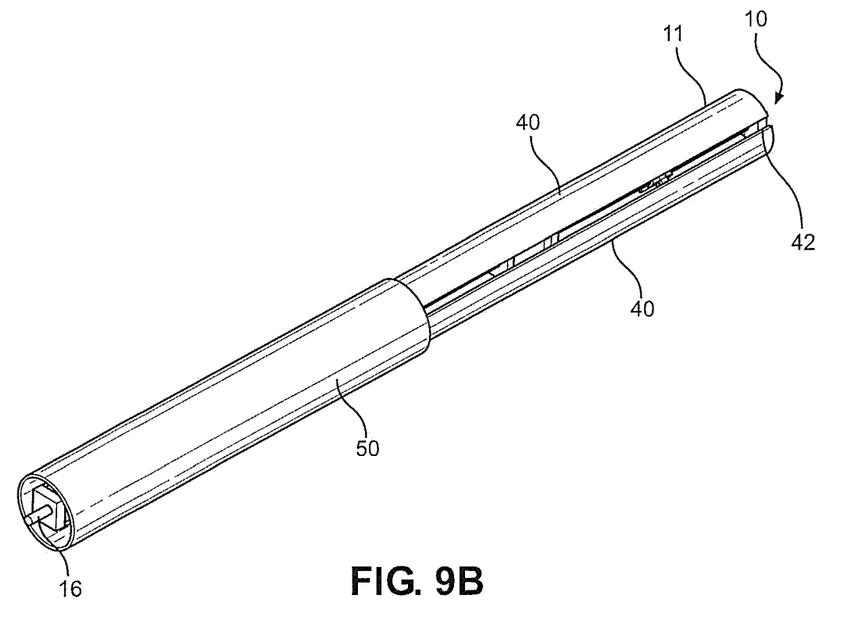
FIG. 9B is top perspective view of a preferred elongated modular collapsible and expandable mandrel for forming prismatic or non-prismatic hollow bars of various cross-sections of the present disclosure showing a hollow bar being formed thereon.

An insert 41 is preferably removably attached, via clips or other suitable fasteners, in each space 42 between adjacent outer segments 40 to reduce the gap between the outer segments 40 when mandrel 10 is used to manufacture hollow bars or cylinders 50. The need for, length and size of each insert 41 depends on the state of expansion of the outer segments 40 of each module 11. Such preferred construction of mandrel 10 allows for a variable cross-section as shown in FIG. 6. Inserts 41 are particularly helpful when manufacturing hollow bars or cylinders 50 to reduce the gaps 42 between adjacent outer segments 40. Preferably, inserts 41 could easily be removed, and the cross-section of module 11 could then be reduced as needed. Inserts 41 preferably have a total length of 3 m, a cross-section of 13 mm×3 mm thick and are made from FRP of GFRP materials. Mandrel 10 is preferably calibrated by turning the Acme rod 15 until gaps 42 are about 16 mm wide on the bottom between the outer shell parts 40. The locations of hub assemblies 30 within internal support assembly 12 were marked, and one outer piece 40 was removed to tighten the stop nuts 35 to the location of the mark then these nuts 35 were tightened against each other. Finally, the removed section 40 was put back and the mandrel 10 was ready for the hand layup manufacturing process for making hollow bars or cylinders 50.

Collapsing and Expanding

The outer diameter of the outer segments 40 of module 11 is adjusted by rotating the threaded ACME rods 14, 15, 16 manually or electrically, using stepper motor 18 which may be controlled wirelessly, to form a precise prismatic or non-prismatic outside shape of the mandrel 10. More specifically, each of the hub assemblies 30 of internal support assembly 12 has three spaced-apart support members 31 movable radially from a fully extended position to a fully retracted position or therebetween by rotating their respective threaded rods 14, 15, 16 within flange-mounted bearings 13. Such rotation, manual or powered, allows nut 34 of each hub assembly 30 to move axially with respect to its attached support members 31 which stay stationary as does the outer mandrel segment 40 to which such support members 31 are attached. Because each hub assembly 30 can move independently of each other hub assembly 30, the support members 31 of each hub assembly can be set at the same or differing outer diameters. In this manner, the outer diameters at different positions of the outer segments 40 of each module 11 can be adjusted as desired to produce prismatic or non-prismatic hollow bars 50. In addition, more or less hub assemblies 30 can be utilized, and their placement customized along threaded rods 14, 15, 16, to produce the outer profile desired for hollow bars 50.

The rods 14, 15, 16 rotate within flange-mounted bearings 13, allowing only the nut 34 of each hub assembly 30 to move left or right. The mandrel 10 can expand and collapse by alternating left-handed threaded-rod 14 and right-handed threaded rod 16 and hub assemblies 30 rather than the entire internal support assembly 12 moving in a single direction. The fabricated modular hybrid electro-mechanical collapsible and expandable mandrel 10 is shown in FIGS. 5, 6, 7, 9A-9B and 10.

To manufacture hollow bars or cylinders 50, preferably GFRP or RFP sheets soaked in epoxy resin are layered around mandrel 10 with the diameter of each section where a hub assembly 30 is located set at the desired diameter. Such sheets are held in place preferably using fiber threads or other suitable fastening means. Once the sheets have cured into a hollow bar or cylinder 50, mandrel 10 is collapsed so that the hollow bar or cylinder 50 can be removed therefrom. Preferably a sheet of low friction material, such as mylar, may be wrapped around mandrel 10 prior to the GFRP or RFP sheets soaked in epoxy resin to facilitate the removal of the hollow bar or cylinder 50 after curing.

Mandrel 10 was preferably created in such a way that it could be internally transformed, allowing prismatic or non-prismatic cells of any length to be obtained. Mandrel 10 preferably comes with accessories that can be attached to it to allow the fabrication of various geometric cells, such as an L-shape 51 or T-shape 60, cross shapes 70 or any imaginable engineering shape, such as shape 80, as shown in FIGS. 8A-8D. These shapes, lengths, and cross-sections will be used in a variety of engineering projects involving the development and testing of an energy-efficient lightweight prefab modular mobile facility generation.

Mandrel 10 and its accessories have a wide range of applications in civil engineering and other fields. Mandrel 10 can be used to create cells with a wide range of cross-sections, infinite lengths, and countless shapes as shown in FIGS. 8A-8D. A few civilian applications are lightweight composite prefabricated mobile homes, lightweight pedestrian bridges, lightweight mobile parts in airports and seaports telecommunication and wind turbine guyed towers, meteorological guyed structures supporting wind instruments, floodlighting poles in cities, airports, dockyards, civilian camps, high-security areas such as prisons, or any defense installation products, monopole structures supporting wind turbine or solar panels, transmission lines, tensile structures, and marine structures.

In the foregoing Detailed Description, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An elongated modular collapsible and expandable mandrel for forming prismatic or non-prismatic hollow bars of various cross-sections, comprising:
   a plurality of outer segments configured to define a prismatic or non-prismatic mandrel outer surface;
   a plurality of hub assemblies with each hub assembly comprising a central hub and a plurality of support members spaced-apart around a perimeter of the central hub, each support member is pivotally attached to a respective one of the plurality of outer segments by a first end of a link with the second end of the link pivotally attached to its respective central hub; and
   means for moving each central hub linearly causing each of its links to pivot toward or away from, depending upon the direction of axial movement of the central hub, a longitudinal axis of the means for moving each central hub linearly while the central hub moves linearly thereby expanding or contracting the cross-sectional dimension of the respective portions of the mandrel to which each of the plurality of hub assemblies is attached.

2. The elongated modular collapsible and expandable mandrel of claim 1, wherein the means for moving each central hub linearly comprises a threaded rod powered by a motor.

3. The elongated modular collapsible and expandable mandrel of claim 1, wherein the means for moving each central hub linearly comprises one or more hydraulic or electrically powered linear actuators.

4. The elongated modular collapsible and expandable mandrel of claim 1, wherein each central hub of the plurality of hub assemblies comprises a threaded nut, wherein each of the threaded nuts is rotatably disposed on an individual or respective threaded rod mounted for rotation between a set of end bearings.

5. The elongated modular collapsible and expandable mandrel of claim 4, further comprising a motor for rotating one or more of the threaded rods.

6. The elongated modular collapsible and expandable mandrel of claim 5, wherein the mandrel comprises three threaded rods and each of the threaded rods are co-linear with each other and the motor rotates one of the threaded rods disposed in the middle between the other two threaded rods.

7. The elongated modular collapsible and expandable mandrel of claim 1, wherein each link is pivotally attached to one or more first tabs on its respective support member and pivotally attached to one or more second tabs on its central hub.

8. The elongated modular collapsible and expandable mandrel of claim 6 wherein each link is pivotally attached to one or more first tabs on its respective support member and pivotally attached to one or more second tabs on its central hub.

9. The elongated modular collapsible and expandable mandrel of claim 1, wherein the mandrel outer surface generally defines the shape of a cylinder, rectangular bar, or a cone.

10. The elongated modular collapsible and expandable mandrel of claim 6, wherein the mandrel outer surface generally defines the shape of a cylinder, rectangular bar, or a cone.

11. The elongated modular collapsible and expandable mandrel of claim 1, wherein each of the plurality of outer segments comprises FRP or GFRP.

12. The elongated modular collapsible and expandable mandrel of claim 6, wherein each of the plurality of outer segments comprises FRP or GFRP.

13. The elongated modular collapsible and expandable mandrel of claim 1, wherein the mandrel has a circular cross-section or a non-circular cross-section.

14. The elongated modular collapsible and expandable mandrel of claim 6, wherein the mandrel has a circular cross-section or a non-circular cross-section.

15. The elongated modular collapsible and expandable mandrel of claim 1, wherein the mandrel has an outside shape that changes from prismatic to non-prismatic along a longitudinal axis of the mandrel.

16. The elongated modular collapsible and expandable mandrel of claim 6, wherein the mandrel has an outside shape that changes from prismatic to non-prismatic along a longitudinal axis of the mandrel.

17. A method for manufacturing prismatic or non-prismatic hollow bars of various cross-sections, comprising:
   providing an elongated modular collapsible and expandable mandrel for forming prismatic or non-prismatic hollow bars of various cross-sections, comprising:
   a plurality of outer segments configured to define a prismatic or non-prismatic mandrel outer surface;
   a plurality of hub assemblies with each hub assembly comprising a central hub and a plurality of support members spaced-apart around a perimeter of the central hub, each support member is pivotally attached to a respective one of the plurality of outer segments by a first end of a link with the second end of the link pivotally attached to its respective central hub; and
   means for moving each central hub linearly causing each of its links to pivot toward or away from, depending upon the direction of axial movement of the central hub, a longitudinal axis of the means for moving each central hub linearly while the central hub moves linearly thereby expanding or contracting the cross-sectional dimension of the respective portions of the mandrel to which each of the plurality of hub assemblies is attached;

linearly moving each central hub to expand or contract as desired the cross-sectional dimension of the respective portions of the mandrel to which each of the plurality of hub assemblies is attached;

wrapping GFRP or RFP material containing epoxy resin around the mandrel outer surface;

curing the GFRP or RFP material containing epoxy resin;

linearly moving each central hub to contract each cross-sectional dimension of the respective portions of the mandrel to which each of the plurality of hub assemblies is attached enough to remove the cured GFRP or RFP epoxy material.

18. The method for manufacturing prismatic or non-prismatic hollow bars of various cross-sections of claim 17, wherein each central hub of the plurality of hub assemblies comprises a threaded nut, wherein each of the threaded nuts is rotatably disposed on an individual or respective threaded rod mounted for rotation between a set of end bearings.

19. The method for manufacturing prismatic or non-prismatic hollow bars of various cross-sections of claim 18, wherein the elongated modular collapsible and expandable mandrel further comprises a motor for rotating one or more of the threaded rods.

20. The method for manufacturing prismatic or non-prismatic hollow bars of various cross-sections of claim 19, wherein the mandrel comprises three threaded rods and each of the threaded rods are co-linear with each other and the motor rotates one of the threaded rods disposed in the middle between the other two threaded rods.

* * * * *